United States Patent
Pletenetskyy et al.

(10) Patent No.: US 9,851,569 B2
(45) Date of Patent: Dec. 26, 2017

(54) MOUNTING APPARATUS FOR HEAD-MOUNTED DISPLAY DEVICE

(71) Applicant: Microsoft Technology Licensing, LLC, Redmond, WA (US)

(72) Inventors: Andriy Pletenetskyy, Mountain View, CA (US); Bernard Schultz, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 14/935,079

(22) Filed: Nov. 6, 2015

(65) Prior Publication Data
US 2017/0131553 A1    May 11, 2017

(51) Int. Cl.
*G02B 27/14*    (2006.01)
*G02B 27/01*    (2006.01)

(52) U.S. Cl.
CPC .. *G02B 27/0176* (2013.01); *G02B 2027/0154* (2013.01); *G02B 2027/0161* (2013.01); *G02B 2027/0178* (2013.01)

(58) Field of Classification Search
CPC ............ G02B 27/0176; G02B 27/0101; G02B 27/0178; G02B 2027/0132; G02B 2027/0154; G02B 2027/011; G02B 2027/0161; G02B 27/0132; G02B 27/0154; G02B 27/011; G02B 27/0161
(Continued)

(56) References Cited

U.S. PATENT DOCUMENTS 3,638,170 A    1/1972    Clement et al.
5,539,422 A *  7/1996    Heacock ............ G02B 27/0172
                                                      345/8
(Continued)

FOREIGN PATENT DOCUMENTS

CN    201967132 U    9/2011
EP      2105781 A1    9/2009
(Continued)

OTHER PUBLICATIONS

"Frameless magnetic universal car phone holder multifunctional car navigation GPS holder car phone holder", Retrieved on: Aug. 17, 2015 Available at: http://www.christmas123456.com/product.php?name=Free+shipping+%21+Frameless+magnetic+universal+car+phone+holder+multifunctional+car+navigation+GPS+holder+car+phone+holder&id=56323.
(Continued)

*Primary Examiner* — Thomas K Pham
*Assistant Examiner* — Vipin Patel
(74) *Attorney, Agent, or Firm* — Arent Fox LLP

(57)    ABSTRACT

A head-mounted display (HMD) device designed for quick and easy mounting and dismounting to and from, respectively, a mounting fixture comprises a display assembly and a chassis coupled to the display assembly. The display assembly includes optical elements configured to convey light to the eyes of a human user when the head-mounted display device is worn by the user. In certain embodiments introduced here, the chassis has an external surface and a fixture interface surface defined within, but not coplanar with, the external surface. The fixture interface surface is configured to mate with a device interface surface of the mounting fixture when the head-mounted display device is mounted to the mounting fixture.

4 Claims, 8 Drawing Sheets

(58) Field of Classification Search
USPC .......... 359/629–633, 636, 639–640, 618
See application file for complete search history.

(56) References Cited

U.S. PATENT DOCUMENTS

| | | | |
|---|---|---|---|
| 6,196,504 B1 | 3/2001 | Lemke | |
| 6,213,521 B1 | 4/2001 | Land et al. | |
| 6,241,369 B1 | 6/2001 | Mackiewicz | |
| 6,480,174 B1 * | 11/2002 | Kaufmann | G02B 27/0172 345/7 |
| 6,570,399 B2 | 5/2003 | Yeghiayan et al. | |
| 7,192,303 B2 | 3/2007 | Kohen | |
| 7,671,614 B2 | 3/2010 | Eldridge et al. | |
| 8,205,848 B2 | 6/2012 | Chen et al. | |
| 8,403,312 B2 | 3/2013 | Zhang et al. | |
| 8,996,166 B2 | 3/2015 | Jenkinson | |
| 2009/0180194 A1 | 7/2009 | Yamaguchi et al. | |
| 2014/0168264 A1 | 6/2014 | Harrison et al. | |

FOREIGN PATENT DOCUMENTS

| | | | |
|---|---|---|---|
| EP | 2924491 A1 | 9/2015 | |
| KR | 1020120000319 A | 1/2012 | |
| WO | 2006058188 A2 | 6/2006 | |
| WO | 2013103985 A2 | 7/2013 | |

OTHER PUBLICATIONS

"Indexing Plungers—Hand Retractable Plungers", Published on: May 9, 2008 Available at: http://www.fixtureworks.net/ProductIndex/IndexingPlungers/tabid/132/Default.aspx?thumbPath=8|0.

"Vibration Test Systems", Published on: Jul. 6, 2014 Available at: http://www.bruelkjaer.de/doc/LdsAppnoteMobilePhoneTesting.pdf.

"Rotated new mount holder for cell phone clip with ¼ screw hole compatible with selfie stick/ monopod/tripod mobile phone clip", Retrieved on: Aug. 17, 2015 Available at: http://www.christmas123456.com/product.php?name=Rotated+new+mount+holder+for+cell+phone++clip+with+1%2F4+screw+hole+compatible+with+selfie+stick%2F+monopod%2Ftripod+mobile+phone+clip&id=1748.

"Test Fixture Design Services", Published on: Feb. 12, 2010 Available at: http://www.gasm.co.il/129965/Test-Fixture.

"International Search Report & Written Opinion Issued in PCT Application No. PCT/US2016/060080", dated Mar. 9, 2017, 18 Pages (MS# 358105-WO-PCT).

"International Preliminary Report on Patentability Issued in PCT Application No. PCT/US2016/060080", dated Sep. 7, 2017, 7 Pages.

* cited by examiner

MOUNTING APPARATUS FOR HEAD-MOUNTED DISPLAY DEVICE

BACKGROUND

Many manufactured products require assembly, testing or calibration prior to sale to a consumer, particularly consumer electronic devices. Consequently, during product development and/or mass production, there may be a need to accurately, quickly and repeatably mount a product to various testing and assembly fixtures. However, the physical form factor of some products may create challenges for doing so.

SUMMARY

Introduced here is a head-mounted display (HMD) device designed for quick and easy mounting and dismounting to and from (respectively) a mounting fixture that may be used for testing, assembly and/or calibration, for example. The HMD device comprises a display assembly and a chassis coupled to the display assembly. The display assembly includes optical elements configured to convey light. In certain embodiments introduced here, the chassis has an external surface and a fixture interface surface defined within, but not coplanar with, the external surface. The fixture interface surface is configured to mate with a device interface surface of the mounting fixture when the head-mounted display device is mounted to the mounting fixture.

Further, in certain embodiments the fixture interface surface is a flat recessed region within the external surface of the chassis, and the external surface of the chassis may be curved. The chassis may further have a through-hole from the fixture interface surface to an internal surface of the chassis, to receive at least a portion of a fastener part of the mounting fixture, that fastens the HMD device to the mounting fixture. The internal surface of the chassis may have a slot that intersects the through-hole, where the slot is shaped to hold in place said portion of the fastener when the HMD device is mounted to the mounting fixture.

Also introduced here is a mounting fixture such as mentioned above, to which an HMD device such as mentioned above can be quickly and easily mounted and dismounted.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Figure 1:
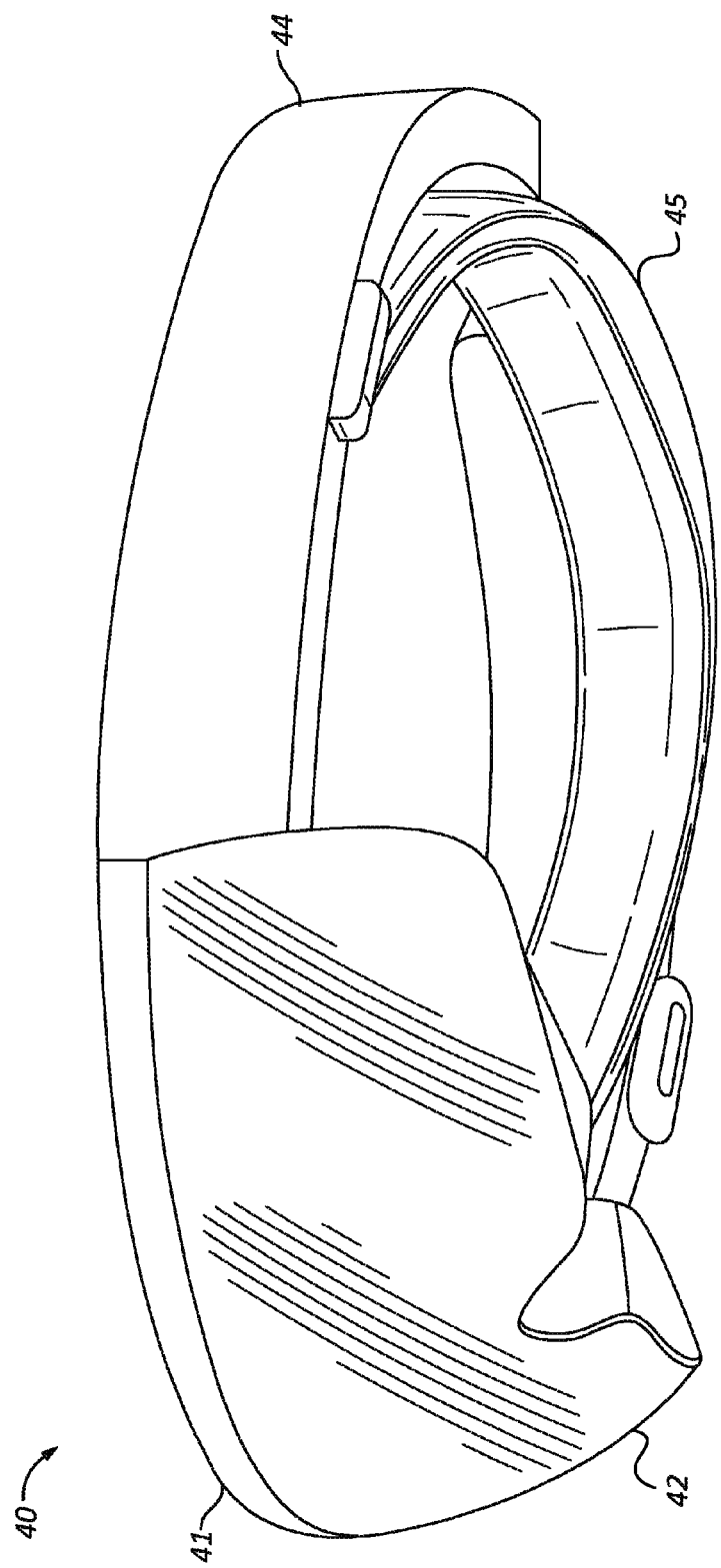
FIG. 1 shows an example of an HMD device that may include features for quick-mounting/dismounting to a mounting fixture.

FIG. 1 shows an example of an HMD device that can include features, such as described further below, to enable it to be quickly mounted to and dismounted from a mounting fixture, such as may be used for assembly, testing and/or calibration. The HMD device 40 may provide virtual reality (VR) and/or augmented reality (AR) display modes for the user, i.e., the wearer of the device. In the illustrated embodiment, the HMD device 40 includes a chassis 41, a transparent protective visor 42 mounted to the chassis 41, and left and right side arms 44 mounted to the chassis 41. Although the chassis 41 and visor 42 do not directly contact the user's head, they are generally curved in shape to conform approximately to a user's head shape. The visor 42 forms a protective enclosure for various display elements and other components (not shown).

The chassis 41 is the mounting structure for the visor 42 and side arms 44, as well as for various sensors and other components (not shown) that are not germane to this description. A display assembly (not shown) that can generate images for display to the user in an AR mode and/or VR mode is also mounted to the chassis 41 and enclosed within the protective visor 42. The visor assembly 42 and/or chassis 41 may also house electronics (not shown) to control the functionality of the display assembly and other functions of the HMD device 40. The HMD device 40 further includes an adjustable headband 45 attached to the chassis 41, by which the HMD device 40 can be worn on a user's head.

It may be necessary or desirable to mount the HMD device 40 onto a mounting fixture for purposes of assembling, testing and/or calibration of the HMD device 40, for example. However, as can be seen from FIG. 1, various external surfaces of the HMD device 40 have curved and/or unusual geometry and, therefore, are not easily adapted for precision alignment or mounting to a fixture. Further, it is desirable to have an uncomplicated mounting mechanism that can be hidden from the user in the fully assembled product (e.g., for aesthetic reasons), yet allow accurate, quick, repeatable and reliable connection to the mounting fixture.

Accordingly, introduced here is a mounting mechanism that allows an HMD device, such as HMD device 40, to be quickly and easily mounted to or dismounted from, respectively, a mounting fixture. As described in greater detail below, the rear exterior surface of the chassis 41 has a recessed fixture interface surface that mates to a protruding device interface surface of the mounting fixture, where the two interface services are held together by spring-loaded clamping force. This configuration constrains the HMD device 40 on the mounting fixture in six degrees of freedom, so that there is no rotation or lateral movement of the HMD device 40. Additional details are described below.

In this description, when referring to a part of the HMD device 40, a "front surface" of a part generally means a surface that is farthest from the user's face, whereas a "rear surface" or "back surface" of the part generally means a surface that is closest to the user's face.

Figure 2:
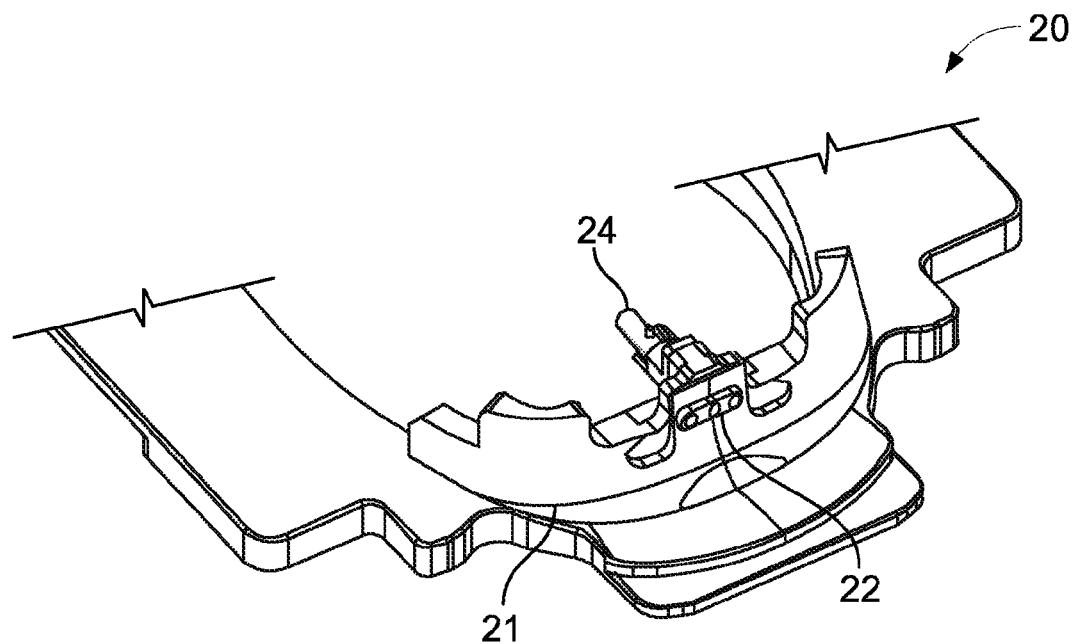
FIG. 2 shows an example of a mounting fixture for the HMD device of FIG. 1.
Figure 3:
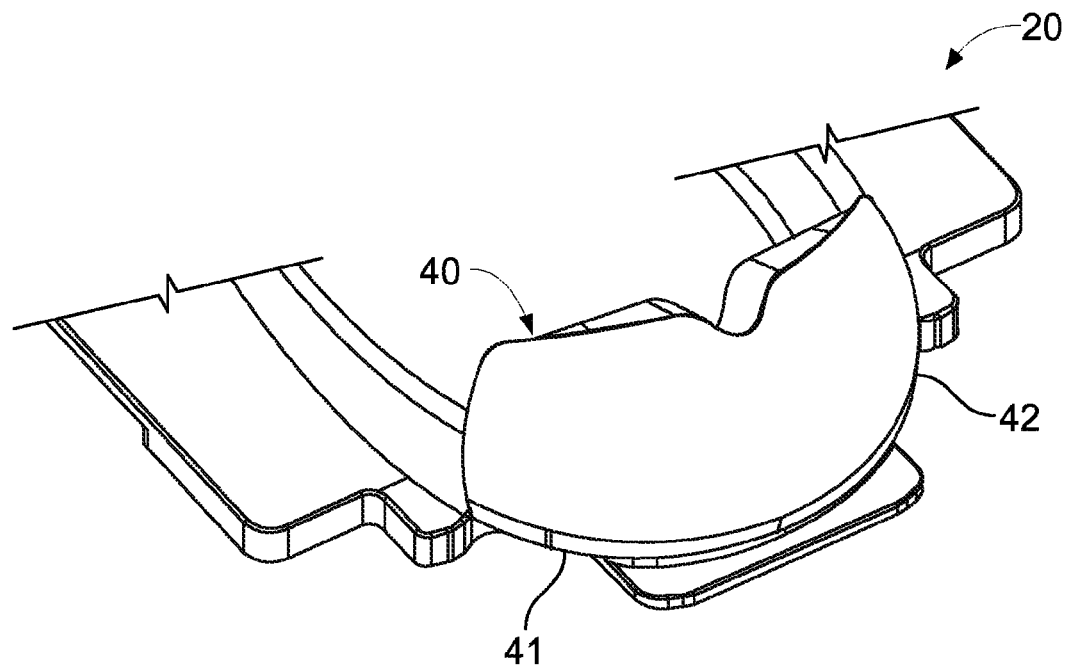
FIG. 3 shows an example of the mounting fixture of FIG. 2 with the HMD device of FIG. 1 mounted on it.

FIG. 2 shows an example of the relevant portion of a mounting fixture 20 for the HMD device 40. The mounting fixture 20 includes a mounting surface 21, upon which the curved rear external surface of the chassis 41 rests when the HMD device 40 (not shown) is mounted to the mounting fixture 20. FIG. 3 shows an example arrangement in which the HMD device 40 is mounted to the mounting fixture 20. As shown in FIG. 3, the HMD device 40 is mounted in an inverted position, i.e., with the bottom of the visor 42 facing up.

The mounting fixture 20 further includes a fixture block 22 that protrudes from the mounting surface 21. The vertical surface of the fixture block 22, which is described in detail below, is the device interface surface, which mates with a fixture interface surface of the chassis 41 of the HMD device 40. The fixture block 22 further has a hole through its center, through which a plunger is passed to engage the fixture interface surface of the chassis 41 of the HMD device 40. The plunger handle 24 is used to insert and remove the plunger.

Figure 4B:
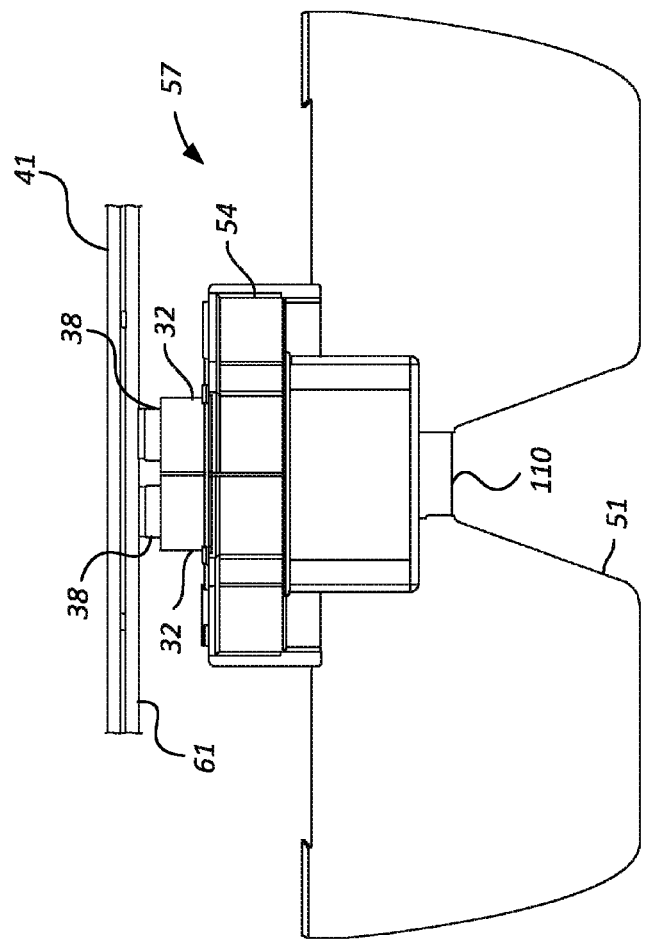
FIGS. 4A and 4B show left and front orthogonal views, respectively, of the display assembly mounted to the interior surface of the chassis.
Figure 4A:
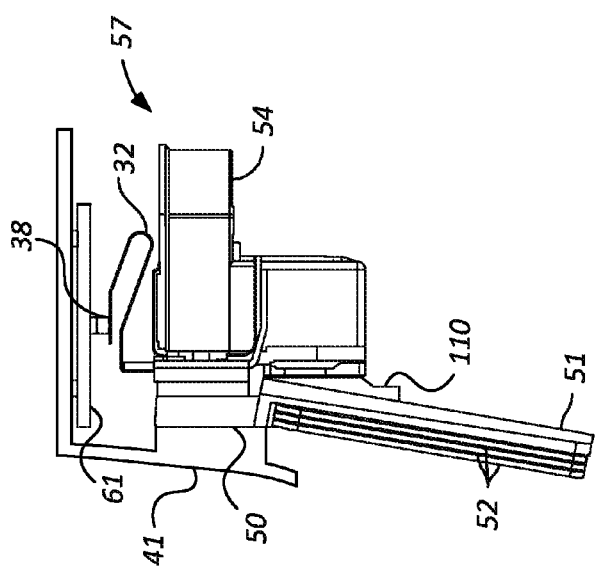

The visor 42 of the HMD device 40 is a protective enclosure for the display assembly and other components of the HMD device 40. FIGS. 4A and 4B show, in accordance with certain embodiments, left and front orthogonal views, respectively, of the display assembly 57 mounted to the interior surface of the chassis 41, without the visor 42 present. The chassis 41 is shown in cross-section in the left side view (its curved shape would otherwise obscure at least partially the display assembly 57, in the illustrated embodiment). The display assembly 57 is designed to overlay three-dimensional images on the user's view of his real-world environment, e.g., by projecting light into the user's eyes. Accordingly, the display assembly 57 includes a display engine assembly 54 that houses components such as: one or more light sources (e.g., one or more light emitting diodes (LEDs)); one or more microdisplay modules, such as liquid crystal on silicon (LCOS), liquid crystal display (LCD), digital micromirror device (DMD); and one or more lenses, beam splitters and/or waveguides, the details of which are not germane to this disclosure.

The display assembly 57 further includes a transparent waveguide carrier 51 to which the display engine assembly 54 is mounted, as well as multiple transparent waveguides 52 for each of the left eye and right eye of the user. The waveguide carrier 51 has a central nose bridge portion 110, from which its left and right waveguide mounting surfaces extend. Multiple waveguides 52 are stacked on each of the left and right waveguide mounting surfaces of the waveguide carrier 51, which align with a left eye and a right eye, respectively, of the user. The entire display assembly 57 is mounted to the chassis 41 through a center tab 50 located at the top of the waveguide carrier 51 over the central nose bridge section 110.

Figure 5:
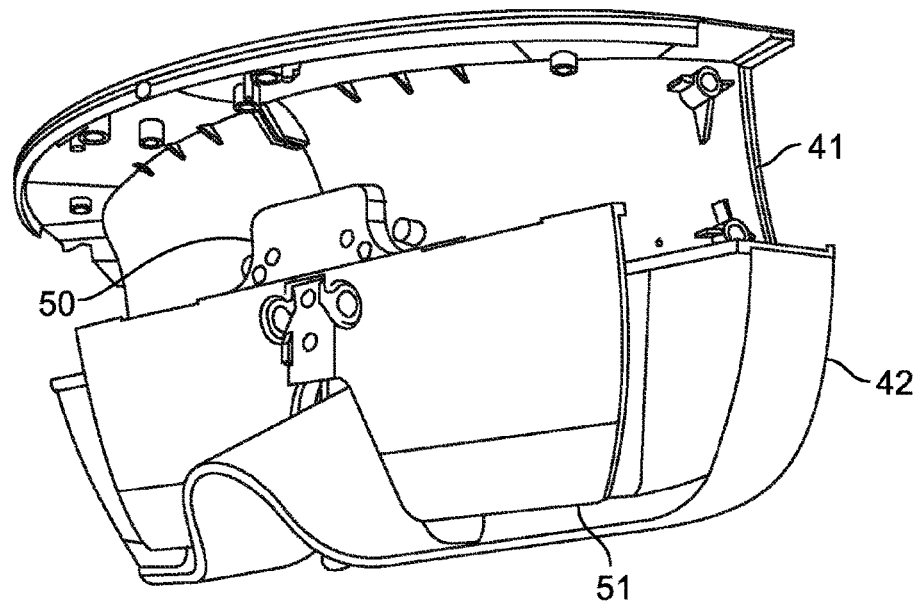
FIG. 5 shows a front perspective view of the waveguide assembly mounted to the chassis within the visor.

FIG. 5 is a front perspective view further illustrating how the waveguide carrier 51 mounts to the chassis 41 within the visor 42 (the display engine assembly 54 and front surface of the visor 42 have been omitted for clarity.) The waveguide carrier 51 mounts to the chassis 41 through the center tab 50 at the top of the waveguide carrier 51. The visor 42 is open at the top where it attaches to the chassis 41. The display assembly 57 (not shown) is suspended from the front side of the waveguide carrier 51 in the fully assembled product.

Figure 6:
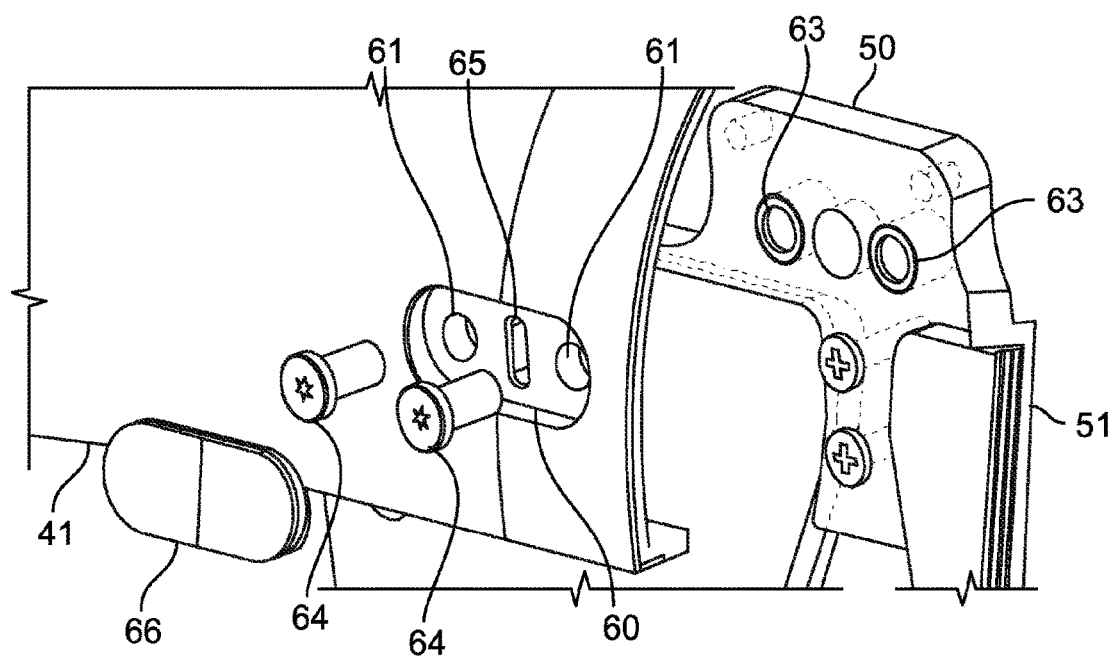
FIG. 6 shows a rear perspective exploded view of the fixture interface surface on the chassis, and related components.

FIG. 6 shows an exploded rear perspective view of the fixture interface surface on the chassis 41, and also shows the waveguide carrier 51. The fixture interface surface 60 is sized and shaped to mate with the device interface surface 72 (FIG. 7) on the fixture block 22 of the mounting fixture 20 (FIG. 2). In the illustrated embodiment the fixture interface surface 60 is a recessed region within (encompassed by) the rear external surface of the chassis 41. The fixture interface surface has two through-holes 61 that pass through to the internal (front) surface (not shown) of the chassis 41. In the assembled device, these holes 61 align with two similarly positioned/sized holes 63 on the center tab 50 of the waveguide carrier 51. The waveguide carrier 51 mounts to the internal surface of the chassis 41 by two screws (or other similar type of fastener) 64 that fit through these aligned holes 61, 63 in the chassis 41 and in the center tab 50 of the waveguide carrier 51.

The chassis 41 also includes a third through-hole 65 that has an elongate shape, that passes completely through the chassis 41 from the fixture interface surface 60 to the internal surface of the chassis 41. This elongate through-hole 65 is designed to accommodate the end of a plunger (from the mounting fixture 20), which is inserted to clamp the HMD device 40 the mounting fixture 20, as described further below. In the illustrated embodiment, the chassis 41 further has a removable cosmetic surface cap 66 that, when installed, sits flush with the external surface of the chassis 41 to hide the through-holes 61, 65 and fasteners 64 from the user.

Figure 7:
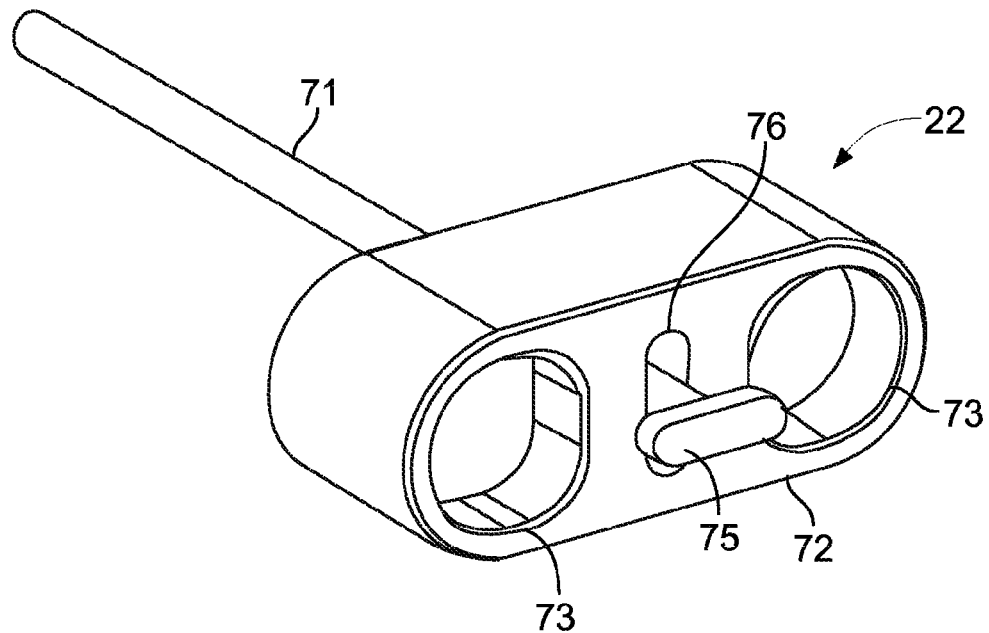
FIG. 7 shows a perspective view of the plunger and device interface surface of the mounting fixture.
Figure 8:
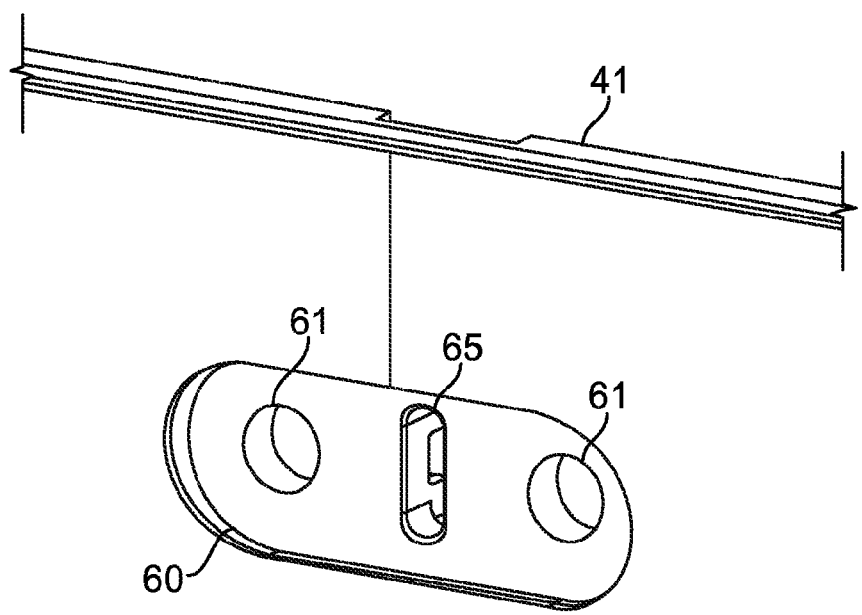
FIG. 8 shows a close-up perspective view of the fixture interface surface of the chassis of the HMD device.
Figure 9:
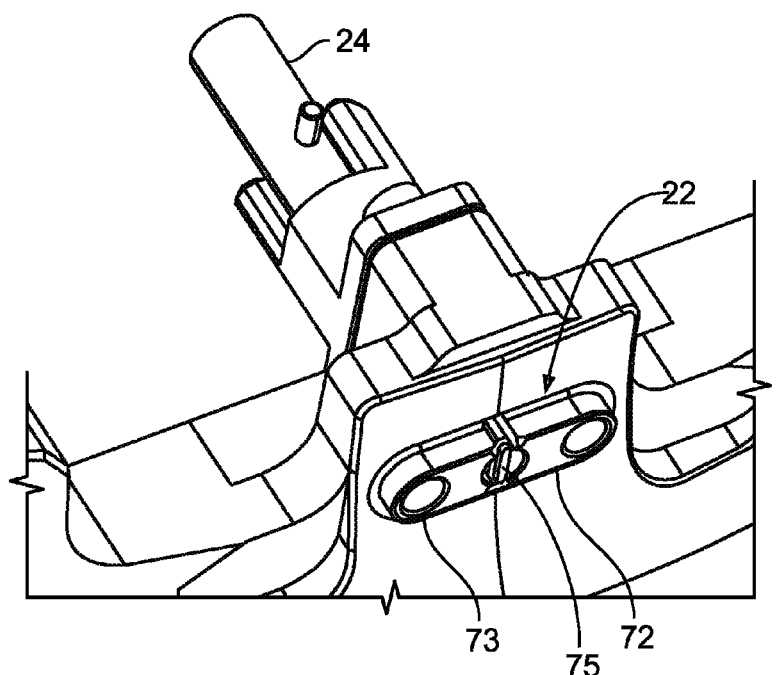
FIG. 9 shows a close-up perspective view of a portion of the mounting fixture that engages the HMD device.

FIG. 7 shows a perspective view of the fixture block 22 and plunger 71. The plunger 71 is slidably disposed within an elongate through-hole 76 in the fixture block 22. The device interface surface 72 of the fixture block 22 is formed to contact and mate with the fixture interface surface 60 (FIG. 8) of the chassis 41 of the HMD device 40. In an implementation, the fixture block 22 and the plunger 71 can be integrated with the mounting fixture 20 as shown in FIG. 9, according to certain embodiments. The illustrated fixture block 22 also includes two circular cavities 73 that fit over the heads of the screws 64 (FIG. 6) allow flush mating of the device interface surface 72 and the fixture interface surface 60, when the HMD device 40 is mounted to the mounting fixture 20. FIG. 8 shows a close-up view of the fixture interface surface 60 on the rear external surface of the chassis 41.

To mount the HMD device 40 to the fixture, the spring-loaded plunger 71 is pushed, via the plunger handle 24, through the elongate through-hole 65 in the chassis 41, which causes the spring 101 (FIG. 10) to be compressed between the plunger handle 24 and the back side of the fixture block 22. The plunger 71 has a T-shaped tip 75 that fits through hole 65 only in the vertical "T" orientation. The internal surface 120 of the chassis 41, shown in FIG. 12, has a horizontal slot 121 that intersects the interior opening of the through-hole 65 to form a cross-shaped recess that indexes the T-shaped tip 75 of the plunger 71 to only two possible positions: 1) a vertical "T" orientation for insertion and extraction of the plunger 71, or 2) horizontal "T" orientation for retention of the plunger 71 to clamp the HMD device 40 to the mounting fixture 20.

Once the tip 75 of plunger 71 has cleared the internal opening of the through-hole 65 on the internal surface of the chassis 41, the plunger handle 24 is twisted (manually or by machine) 90 degrees and allowed to move back towards the fixture blocks 22 by spring force from the compressed spring 101. The tip 75 of plunger 71 is then held in place by the horizontal slot 121 on the internal surface 120 of the chassis 41, thus clamping the chassis 41 to the fixture block 22. This configuration fully constrains the HMD device 40 to the mounting fixture 20 in six degrees of freedom. To remove the HMD device 40 from the mounting fixture 20, the reverse procedure is performed, i.e., the plunger handle 24 is pushed in against the spring force to cause the tip 75 of the plunger 71 to clear the detent, and is then twisted 90 degrees and released. The spring force from the compressed spring 101 then moves the plunger 71 out of the enclosure of the chassis 41 and thereby fully releases the HMD device 40 from the mounting fixture 20.

Figure 10:
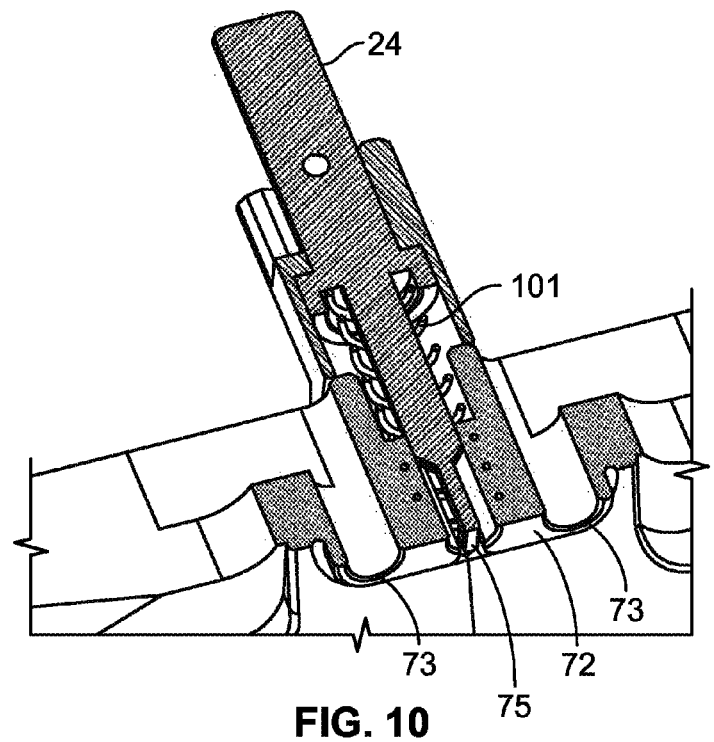
FIG. 10 shows a three-dimensional (3D) cross-sectional, close-up perspective view of the portion of the mounting fixture shown in FIG. 9.

FIG. 9 shows a close-up perspective view of a portion of the mounting fixture 20 that includes the device interface surface 72 of fixture block 22, the plunger 71 and plunger handle 24. FIG. 10 shows a close-up, 3D cross-sectional perspective view of that portion of the mounting fixture 20 shown in FIG. 9, further illustrating (in cross-section) the spring 101 that provides the clamping force to clamp the chassis 41 to the mounting fixture 20 when the plunger 71 is engaged with the chassis 41.

Figure 11:
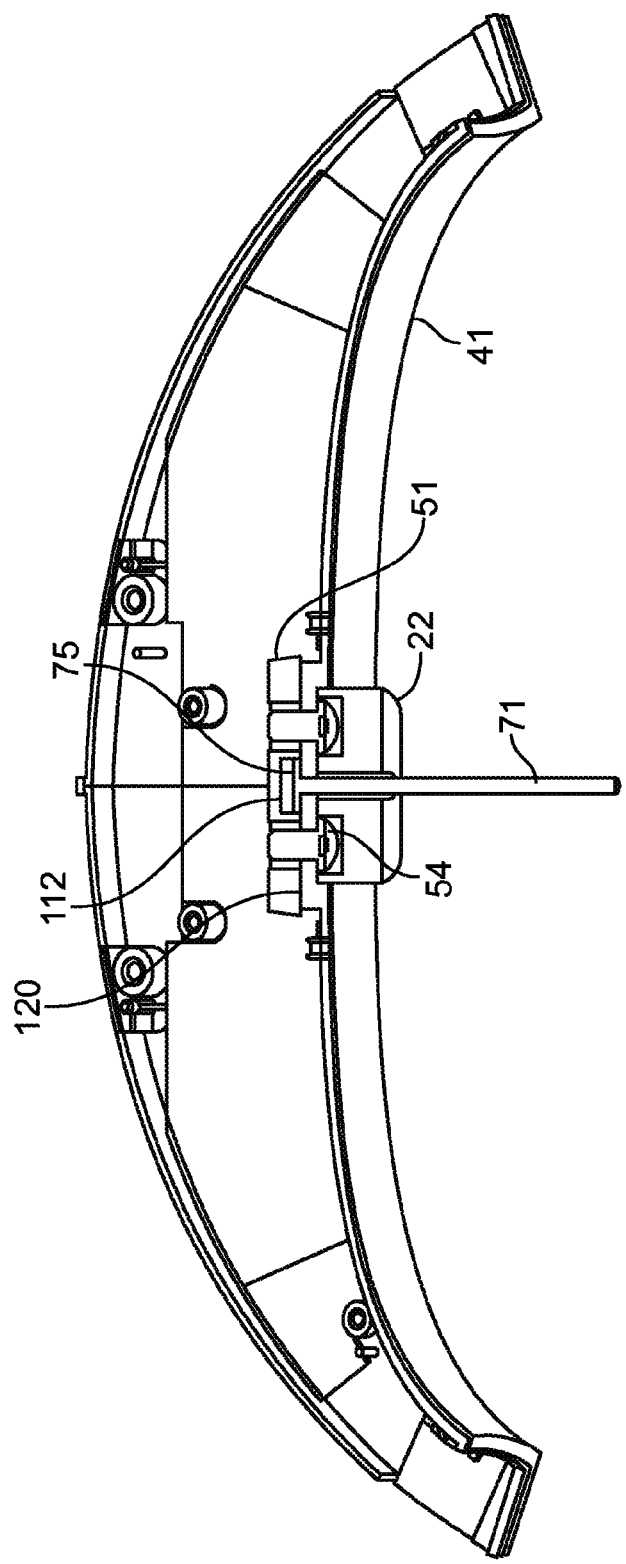
FIG. 11 shows a 3D cross-sectional bottom view of the chassis with the mounting apparatus engaged with it.
Figure 12:
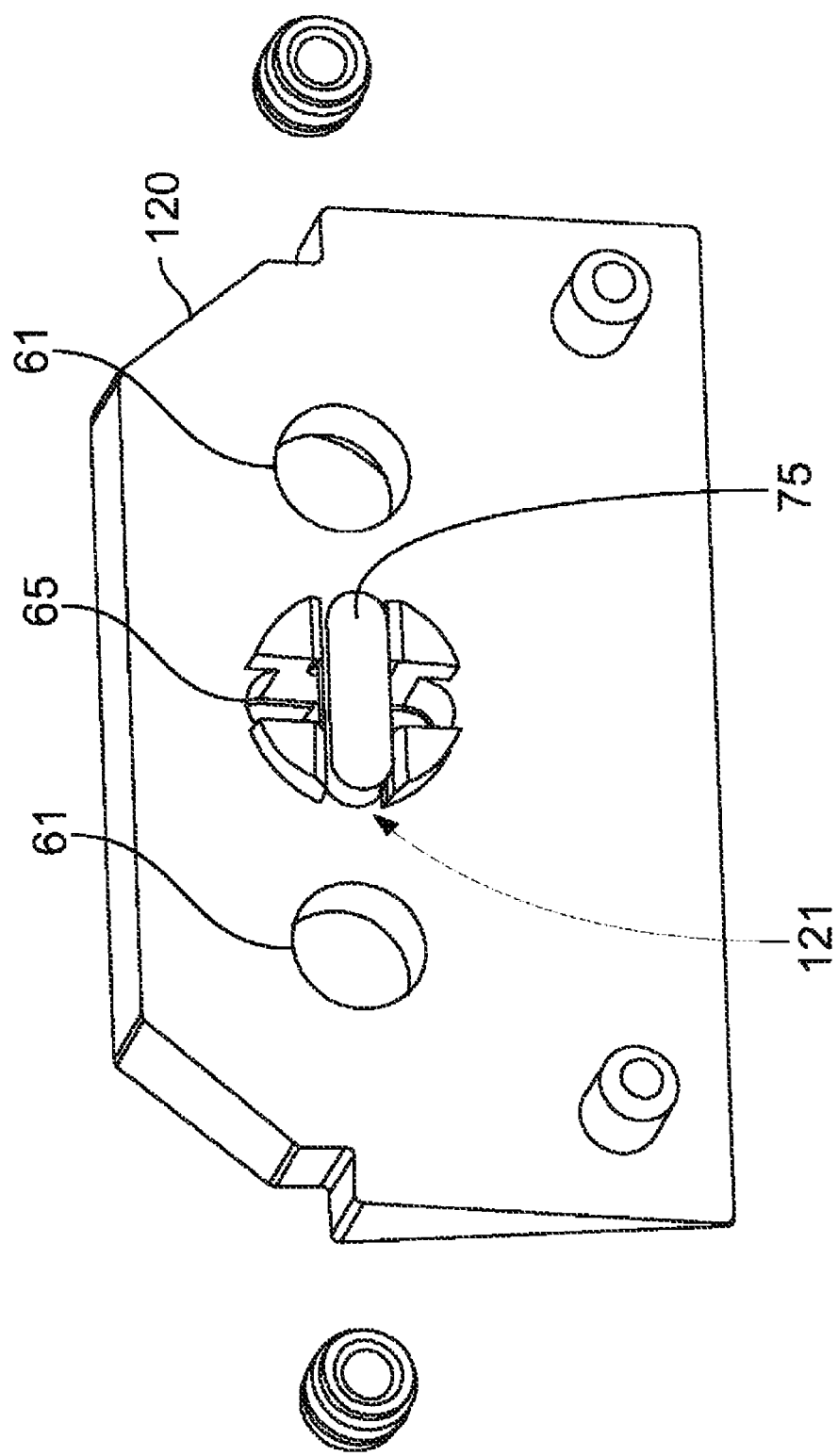
FIG. 12 shows a close-up rear perspective view of the portion of the internal surface of the chassis that engages the plunger.

FIG. 11 shows a 3D cross-sectional cut-away bottom view of the chassis 41 when engaged with the mounting fixture 20, i.e., when the tip 75 of the plunger 71 is engaged with the internal surface 120 of the chassis 41. Also visible is a sectioned surface of the center tab 50 of the waveguide carrier 51 mounted to the internal surface 120 of the chassis 41. The center tab 50 of the waveguide carrier 51 includes a circular cavity 112, which fits over the through-hole 65 in the chassis 41 and provides sufficient space for the T-shaped tip 75 of the plunger 71 to be inserted and twisted during mounting and it's nothing of the HMD device 40 to/from the mounting fixture. FIG. 12 shows a close-up rear perspective view of the portion of the internal surface 120 of the chassis 41, which engages the plunger 71.

Hence, introduced here is, among other things, a mounting means, in an HMD device, for enabling the chassis of the HMD device to be mounted to a device interface surface of a mounting fixture. That mounting means can be embodied as, for example, the recessed fixture interface surface 60, through-hole 65 and slot 121 in the chassis 41, as described above. Also introduced here is a corresponding mounting means on the mounting fixture, where that mounting means on the mounting fixture can be embodied as, for example, the protruding fixture block 22 including device interface surface 72, through-hole 76, and spring-loaded plunger 71 that can engage the above-mentioned mounting means of the HMD device.

EXAMPLES OF CERTAIN EMBODIMENTS

Certain embodiments of the technology introduced herein are summarized in the following numbered examples:

1. A head-mounted display device comprising: a display assembly including optical elements configured to convey light; and a chassis coupled to the display assembly, the chassis having an external surface and a fixture interface surface defined within, but not coplanar with, the external surface, the fixture interface surface being configured to mate with a device interface surface of a mounting fixture when the head-mounted display device is mounted to the mounting fixture.

2. The head-mounted display device of example 1, wherein the fixture interface surface is a recessed region within the external surface of the chassis.

3. The head-mounted display device of example 1 or example 2, wherein the external surface is curved, and the fixture interface surface is planar.

4. The head-mounted display device of any of examples 1 to 3, wherein the chassis further has a through-hole from the fixture interface surface to an internal surface of the chassis, to receive at least a portion of a fastener that fastens the head-mounted display device to the mounting fixture.

5. The head-mounted display device of any of examples 1 to 4, wherein the internal surface of the chassis has a slot that intersects the through-hole, the slot being shaped to hold in place said portion of the fastener when the head-mounted display device is mounted to the mounting fixture.

6. The head-mounted display device of any of examples 1 to 5, wherein the slot has an angular offset from the through-hole about an axis perpendicular to the fixture interface surface.

7. The head-mounted display device of any of examples 1 to 6, wherein the through-hole has an elongate shape when viewed perpendicular to the fixture interface surface, and wherein the slot has an angular offset from a long dimension of the elongate shape of the through-hole.

8. The head-mounted display device of any of examples 1 to 7, wherein the display assembly includes a waveguide carrier, the waveguide carrier including a central bridge and left and right waveguide mounting surfaces extending from the central bridge, the left and right waveguide mounting surfaces each having at least one waveguide mounted thereon and positioned to align with a left eye and a right eye, respectively, of the user.

9. The head-mounted display device of any of examples 1 to 8, wherein the waveguide carrier is mounted through the central bridge to the chassis at an internal surface of the chassis.

10. The head-mounted display device of any of examples 1 to 9, wherein: the chassis further has a through-hole from the fixture interface surface to an internal surface of the chassis to receive at least a portion of a fastener to fasten the head-mounted display device to the mounting fixture; the internal surface of the chassis has a slot that intersects the through-hole, the slot being shaped to receive and hold in place a portion of the fastener when the head-mounted display device is mounted to the mounting fixture; the central bridge of the waveguide carrier has a first surface mounted to the internal surface of the chassis, the first surface having a cavity defined therein which encompasses at least a portion of the through-hole and at least a portion of the slot.

11. The head-mounted display device of any of examples 1 to 10, wherein the chassis is configured to have a printed circuit board mounted thereto.

12. A head-mounted display device comprising: a display assembly including a central bridge and left and right optical elements coupled to the central bridge, the left and right optical elements being positioned so as to align with a left eye and a right eye, respectively, of a user of the display device when the display device is worn by the user; and a chassis having an internal surface to which the display assembly is mounted through the central bridge, the chassis further having a curved external surface and a planar fixture interface surface defined as a recession within the external surface, the fixture interface surface configured to contact a device interface surface of a mounting fixture when the head-mounted display device is mounted to the mounting fixture and not worn by the user, the chassis further having an elongate through-hole from the fixture interface surface to an internal surface of the chassis.

13. The head-mounted display device of example 12, wherein the internal surface of the chassis has a slot that intersects the through-hole, the slot being shaped to receive and hold in place said portion of the fastener when the head-mounted display device is mounted to the mounting fixture.

14. The head-mounted display device of example 12 or example 13, wherein the display assembly includes a waveguide carrier mounted through the central bridge to the chassis at the internal surface of the chassis, the waveguide carrier including the central bridge and left and right mounting surfaces extending from the central bridge, the left and right mounting surfaces each having at least one waveguide mounted thereon and positioned to align with a left eye and a right eye, respectively, of the user.

15. The head-mounted display device of any of examples 12 to 14, wherein the internal surface of the chassis has a slot that intersects the through-hole, the slot being shaped to receive and hold in place said portion of the fastener when the head-mounted display device is mounted to the mounting fixture.

16. The head-mounted display device of any of examples 12 to 15, wherein the central bridge of the waveguide carrier has a first surface mounted to the internal surface of the chassis, the first surface having a cavity defined therein which encompasses at least a portion of the through-hole and at least a portion of the slot.

17. A head-mounted display device comprising: a display assembly including optical elements positioned to convey light to the eyes of a human user when the head-mounted display device is worn by the user; and a chassis to which the display assembly is mounted, the chassis including mounting means for enabling the chassis to be mounted to a device interface surface of a mounting fixture.

18. The head-mounted display device of example 17, wherein the chassis has an internal surface to which the display assembly is mounted, and wherein the chassis further has an external surface, the mounting means including a fixture interface surface defined within the external surface, that contacts the device interface surface of the mounting fixture when the head-mounted display device is mounted to the mounting fixture.

19. The head-mounted display device of example 17 or example 18, wherein the fixture interface surface is a recessed region within the external surface of the chassis.

20. The head-mounted display device of any of examples 17 to 19, wherein the chassis further has a through-hole from the fixture interface surface to an internal surface of the chassis, to receive at least a portion of a fastener for fastening the head-mounted display device to the mounting fixture.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A head-mounted display device comprising:
a display assembly including optical elements positioned to convey light to the eyes of a human user when the head-mounted display device is worn by the user; and
a chassis to which the display assembly is mounted, the chassis including mounting means for enabling the chassis to be mounted to a device interface surface of a mounting fixture.

2. The head-mounted display device of claim 1, wherein the chassis has an internal surface to which the display assembly is mounted, and wherein the chassis further has an external surface, the mounting means including a fixture interface surface defined within the external surface, that contacts the device interface surface of the mounting fixture when the head-mounted display device is mounted to the mounting fixture.

3. The head-mounted display device of claim 2, wherein the fixture interface surface is a recessed region within the external surface of the chassis.

4. The head-mounted display device of claim 2, wherein the chassis further has a through-hole from the fixture interface surface to an internal surface of the chassis, to receive at least a portion of a fastener for fastening the head-mounted display device to the mounting fixture.

* * * * *